UNITED STATES PATENT OFFICE.

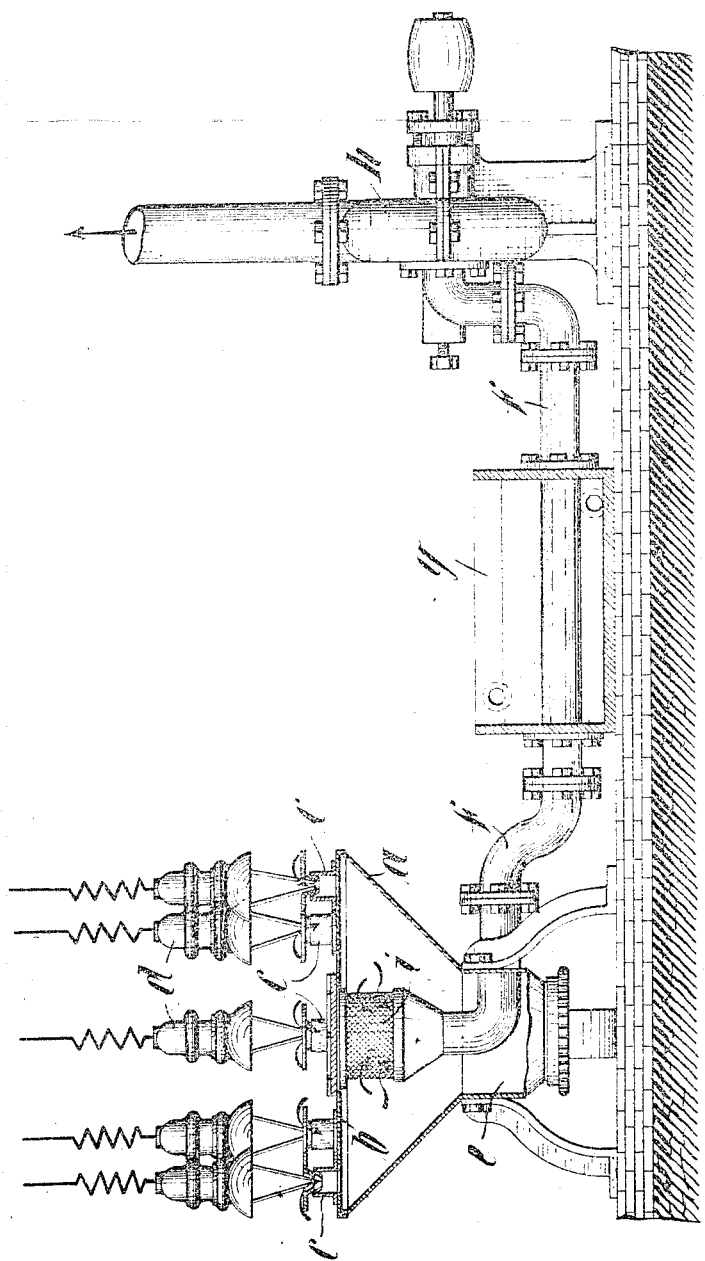

CARL TRETTAU, OF GIMMEL, GERMANY.

APPARATUS FOR AERATING AND CLEANING FLOUR, GRITS, AND THE LIKE.

No. 845,016.    Specification of Letters Patent.    Patented Feb. 12, 1907.

Original application filed October 17, 1905, Serial No. 283,198. Divided and this application filed November 2, 1906. Serial No. 341,678.

To all whom it may concern:

Be it known that I, CARL TRETTAU, a subject of the King of Prussia, residing at Gimmel, district Oels, Province of Silesia, and German Empire, have invented new and useful Improvements in Apparatus for Aerating and Cleaning Flour, Grits, and the Like, of which the following is a specification.

The subject of the present invention is an apparatus for aerating and cleaning flour, grits, and the like.

This application is a division of my application, Serial No. 283,198, filed October 17, 1905.

By means of this invention not only is the flour or like material rendered capable of keeping better, but any impurities—such as bacteria, fungi, and living organisms, (as, for instance, moths, moth-eggs, worms and their breed, &c.,) which may get into the final product during treatment of the grain in the mill—are destroyed. In this manner the flour is improved from an hygienic standpoint and also rendered finer to the eye, owing to the cleansing.

Various attempts have already been made by millers to "fine" or purify flour by chemical means. The processes proposed for the purpose, however, have not come into general use, as the chemical agents employed are themselves injurious to the health and detrimentally affect flours destined for purposes of nutrition. All these processes based solely on the treatment of the flour with chemical agents must, therefore, for hygienic reasons be condemned.

The present invention is based upon the fact that the objectionable tendency of flour to become very quickly tainted by foreign odors and to go bad after a relatively short space of time is due to the flour from the first not having been brought into intimate contact with fresh pure active air and, on the other hand, to its having during its conversion into bakers' flour become mixed with extremely large quantities of organic impurities of the kind already stated, such as it is impossible to avoid when milling is carried on as at present.

The purpose of the new apparatus embodying my invention, therefore, is to thoroughly aerate the flour either after or during the grinding processes by means of pure active air and at the same time to destroy the injurious organic impurities, whereby the flour is cleaned and is rendered capable of keeping better, its appearance also being improved. This is done by conducting through the descending flour by means of a ventilator, pump, or the like a weak current of atmospheric air heated, preferably, to a very high degree. By preference this is carried out in the bolting-machine, (whether with flat sieves, cylinders, or the like.) The heating of the air is effected by causing the air sucked or forced into the bolting-machine before entrance into the bolt to pass a flame of an extremely high temperature—such as, for instance, the flame of an oxyhydrogen blowpipe, of an electric arc, or the like.

In the case of good quality flour containing but few microbes and like impurities thorough aerating by means of cool but pure active air—for example, at a temperature of about 30° centigrade—is sufficient. In the event of the flour being highly contaminated, on the contrary, the air should be the hotter the greater the degree of impurity and moisture. In the former case the freshened air coming from the heating-flame should not be directly conducted into the stream of flour, but first cooled in any suitable and well-known manner before being conducted into the bolting-machine or the like.

Owing to the extremely high temperature of the flame of the blowpipe or arc, the air will be so highly heated that not only will the pathogenic bacteria and germs in the air be killed, but the air will be simultaneously perfectly dried. Furthermore, the high temperature of the flame acts upon the air passing through in such manner that the latter even after being very much cooled down still possesses the power of destroying germs. Despite such cooling the air thus enters the bolt in a condition which results in destruction of the bacteria and germs.

One form of construction of the apparatus is illustrated in the accompanying drawing, in which the figure is an elevation and part section. The heating is here shown to be done by means of electric arcs, which have the advantage of cheapness and cleanliness.

$a$ is a hopper closed by a plate $b$. In the latter apertures are provided, over which small cylinders $c$ are disposed. Above the cylinders electric-arc lamps $d$ are suspended in such manner that the arc lies above the mouth of the cylinders $c$. The hopper $a$ terminates below in a tubular portion e, to which the pipe f is connected. A water cooling and purifying device is inserted in the pipe f.

The ventilator h sucks air from the atmosphere past the arcs, through the cylinders c, and into the hopper a. In order that particles falling from the lamp-carbons and any other impurities may not enter the pipe f, a screen or filter i is provided in the hopper. The air thus passes through this screen and is further cleaned and cooled in the water-purifying apparatus g or in any other suitable manner. The air is then conducted direct into the bolting-machine, where by contact with the air-current the flour or the like is cleansed and freed from all germs and its appearance rendered purer. The plate b is also provided with small manholes and windows, while the tubular part e is furnished with a detachable bottom in order to admit of the apparatus being cleaned out.

What I do claim as my invention, and desire to secure by Letters Patent, is—

1. Apparatus for aerating and cleaning flour, grits and the like, comprising a chamber having apertures, heating means located before the latter, an air-duct leading from the chamber to a descending stream of the material to be treated, and means for causing a current of air to pass through the apparatus to the said material, substantially as described.

2. Apparatus for aerating and cleaning flour, grits and the like, comprising a chamber having apertures, heating means located before the latter, an air-duct leading from the chamber to a descending stream of the material to be treated, an air-cooling device connected in the air-duct, and means for causing a current of air to pass through the apparatus to the said material, substantially as described.

3. Apparatus for aerating and cleaning flour, grits and the like, comprising a hopper having apertures, electric arcs located before the latter, an air-duct leading from the hopper to a bolting-machine and means for causing a current of air to pass through the apparatus to the said machine, substantially as described.

4. Apparatus for aerating and cleaning flour, grits and the like, comprising a hopper having apertures, electric arcs located before the latter, an air-duct leading from the hopper to a bolting-machine, a water-cooling device connected in the air-duct, and means for causing a current of air to pass through the apparatus to the said machine, substantially as described.

In testimony whereof I have signed my name to this specification in the presence of two subscribing witnesses.

CARL TRETTAU.

Witnesses:
OTTO W. HELLMRICH,
IDA CHRIST. HAFERMANN.